United States Patent [19]

Mehta et al.

[11] Patent Number: 5,329,991
[45] Date of Patent: Jul. 19, 1994

[54] PRE-PROGRAMMED ELECTRONIC PROGRAMMABLE THERMOSTAT

[75] Inventors: Vinay Mehta; James L. Barrett, both of Germantown, Tenn.; Yuk Ming Wong, Kowloon, Hong Kong

[73] Assignee: Hunter Fan Company, Memphis, Tenn.

[21] Appl. No.: 971,645

[22] Filed: Nov. 5, 1992

[51] Int. Cl.⁵ ............................................. F25B 29/00
[52] U.S. Cl. ................................. 165/12; 236/46 R; 236/94
[58] Field of Search ................. 165/12; 236/46 R, 94; 364/557, 146

[56] References Cited

U.S. PATENT DOCUMENTS

| | | | |
|---|---|---|---|
| 4,001,557 | 1/1977 | Stephenson | 236/46 R |
| 4,335,847 | 6/1982 | Levine | 165/2 |
| 4,428,528 | 1/1984 | Renault | 165/12 |
| 4,669,654 | 2/1987 | Levine et al. | 236/46 R |
| 4,702,305 | 10/1987 | Beckey et al. | 165/12 |
| 4,751,961 | 6/1988 | Levine et al. | 165/12 |
| 4,771,392 | 9/1988 | Hall | 236/46 R |
| 4,997,029 | 3/1991 | Otsuka et al. | 165/12 |
| 5,022,460 | 6/1991 | Brown | 165/12 |

*Primary Examiner*—A. Michael Chambers
*Attorney, Agent, or Firm*—Baker & Botts

[57] ABSTRACT

An electronic programmable thermostat having a plurality of program sets, each comprising a plurality of times and a corresponding plurality of temperatures is disclosed. To program the thermostat, the user merely selects a program set and the plurality of times and temperatures corresponding to the selected program set is programmed into the thermostat to control the heating and/or cooling systems controlled by the thermostat.

18 Claims, 5 Drawing Sheets

FIG. 1

| (REMAINDER) | OFFSET ↓ | | → OFFSET | 0<br>+0<br>6.00<br>8.00<br>4.30<br>11.00 | 1<br>+0.30<br>6.30<br>8.30<br>5.00<br>11.30 | 2<br>+1.00<br>7.00<br>9.00<br>5.30<br>12.00 | 3<br>−0.30<br>5.30<br>7.30<br>4.00<br>10.30 | 4 (QUOTIENT)<br>−1.00<br>5.00<br>7.00<br>3.30<br>10.00 |
|---|---|---|---|---|---|---|---|---|
| 1 | +0 +0 | H C | 68-63-68-60<br>78-83-78-77 | 1 | 10 | 19 | 28 | 37 |
| 2 | +1 +1 | H C | 69-64-69-61<br>79-84-79-78 | 2 | 11 | 20 | 29 | 38 |
| 3 | −1 −1 | H C | 67-62-67-59<br>77-82-77-76 | 3 | 12 | 21 | 30 | 39 |
| 4 | +1 −1 | H C | 69-64-69-61<br>77-82-77-76 | 4 | 13 | 22 | 31 | 40 |
| 5 | −1 +1 | H C | 67-62-67-59<br>79-84-79-78 | 5 | 14 | 23 | 32 | 41 |
| 6 | +2 −0 | H C | 70-65-70-62<br>78-83-78-77 | 6 | 15 | 24 | 33 | 42 |
| 7 | −0 +2 | H C | 68-63-68-60<br>80-85-80-79 | 7 | 16 | 25 | 34 | 43 |
| 8 | +2 +2 | H C | 70-65-70-62<br>80-85-80-79 | 8 | 17 | 26 | 35 | 44 |
| 9 | −2 −2 | H C | 66-61-66-58<br>76-81-76-75 | 9 | 18 | 27 | 36 | 45 |

PRE-PROGRAMMED ELECTRONIC PROGRAMMABLE THERMOSTAT

FIELD OF THE INVENTION

The invention relates to the field of electronic thermostats and more particularly to a pre-programmed electronic thermostat.

BACKGROUND OF THE INVENTION

There are several programmable thermostats now available in the market. Typically, to operate these thermostats, a user individually selects a plurality of times and individually assigns a desired temperature to each time. This information is stored in a memory of the thermostat. The thermostat then controls the heating and/or cooling system according to the programmed times and temperatures in a well known manner. An example of one program is shown in Table 1.

TABLE 1

| Prog. | Time | Temperature | Remarks |
|---|---|---|---|
| 1 | 6:00 AM | 68 F. | Wake up |
| 2 | 8:00 AM | 60 F. | No one at home |
| 3 | 3:30 PM | 69 F. | Children return home |
| 4 | 11:00 PM | 63 F. | Sleep |

As can be seen from Table 1, four times and temperatures are entered. These entries are designated by program numbers (1-4). Each of these programs numbers has associated with it a time and a temperature. The remarks are provided as an explanatory device for this example. In this example, at 6:00 AM the temperature is set at 68 F. This corresponds to a time when people would normally wake up in the house. By 8:00 AM everyone leaves the house so the temperature can be lowered. In this case, at 8:00 AM the temperature setting is lowered to 60 F. At 3:30 PM the children return to home so it is desirable to raise the temperature to 69 F. Finally at 11:00 PM everyone goes to sleep so the temperature is lowered, in this case, to 63 F. It is to be noted that this is just one example of a program set containing a plurality of times and temperatures which is used to vary the temperature throughout the day based on the schedule of individuals in the house or other environment which the thermostat is to control. It is to be understood that other programs may be desirable for other users. More or less than four times and temperatures may also be desired.

In many of these thermostats, a default program is provided. The default program is a program which is automatically loaded into the memory during power-up of the thermostat. In essence, it is part of an initialization of the thermostat. The thermostat controls the heating and cooling system according to the default program parameters if the user does not insert his or her own program at the time of installation or after power-up. An example of a typical default program is shown in Table 2.

TABLE 2

| Prog. | Time | Temperature |
|---|---|---|
| 1 | 0.00 | 68 F. |
| 2 | 0.00 | 68 F. |
| 3 | 0.00 | 68 F. |
| 4 | 0.00 | 68 F. |

In this case, the four times and temperatures are the same for each of the program numbers. Since there is no time distinction made, the thermostat will always be set at 68 F. until a user actually programs different times and temperature information. Therefore, the default program typically remains operable until the user separately programs time and temperature information as desired, for example, as shown in Table 1.

In other cases, the thermostat may have a default program similar to the one shown in Table 1, with a plurality of different times and corresponding plurality of temperatures. In this case, as soon as the unit is powered-up, the thermostat is set according to this default program. The user then alters these settings by individually inserting new times and temperatures as desired. Usually "Hours", "Min" and "Temp" and arrow up/down keys (or similar keys) are used to alter the programs in a program mode in a well known manner. Since the default program has a program set with several times and temperatures which are pre-programmed, these devices are sometimes referred to as "pre-programmed" thermostats. One patent which describes this type of "pre-programmed" thermostat is U.S. Pat. No. 4,308,991. In this patent, the inventors describe the "pre-programmed" concept discussed above, and a method to access those programs and change them to the desired settings. However, various drawbacks exist with the foregoing thermostats.

One problem with the prior art is that since only one pre-programmed program exists, users must individually select and program their own times and temperature to program their thermostat according to their own desired times and temperatures. This is sometimes confusing for some and overly complicated for others. What is needed is a simpler mechanism to enable users to customize or "program" their thermostats.

SUMMARY OF THE INVENTION

It is an object of the present invention to overcome these and other drawbacks of the prior art. Specifically, it is one object of the present invention to simplify the user programming of programmable thermostats.

According to one embodiment of the present invention, a programmable thermostat is provided with a plurality of pre-programmed program sets each of which has plurality of times and a corresponding plurality of temperatures. Instead of individually selecting and programming times and temperatures, a user merely selects a number corresponding to a program which is "pre-programmed". For example, a thermostat according to the present invention may have 40 or more pre-programmed program sets, depending upon the size of the memory available and the flexibility desired. Preferably, the sets are numbered (e.g., 1,2,3, . . . ) or lettered (e.g., A,B,C . . . ) or are designated with some combination thereof. For convenience, it will be assumed the programs are numbered. As used herein, the term "program set" shall refer to a program including a group of times and corresponding temperatures associated therewith. For example, the times and temperatures associated with program numbers 1-4 in Table 1 constitute a program set.

According to one aspect of the present invention, to program the thermostat with a plurality of desired times and temperatures, the user simply selects the number corresponding to the desired program set and the thermostat is automatically programmed with the plurality of times and temperatures which correspond to the selected program set.

To implement one embodiment of the present invention, there may be a memory for storing a plurality of program sets. In order to access a desired program set, a matrix having a plurality of rows and columns in provided. Preferably, each column has a plurality of times associated therewith and each row has a set or sets of a plurality of temperatures associated therewith. In operation, the user selects a desired column and row according to the times and temperatures listed in the headings for the columns and rows. The user then selects the number (or other designator) which is at the intersection of the column and row desired. By selecting this number, the desired program set (times and temperatures) associated with the selected column and row is automatically programmed into the thermostat memory.

In an alternative embodiment, one or more standard program sets may be stored and a plurality of other program sets can be generated therefrom based on one or more constants or formulas. In this embodiment, each program set may have times and temperatures which vary by a constant factor with respect to the times and/or temperatures of the stored program set(s). In this manner, a "virtual matrix" can be generated using one or more stored program sets and one or more formulas or constants. The term "virtual matrix" is used to denote that, even though all of the program sets are not actually stored, for the user, the operation appears the same as if the actual program sets were stored.

BRIEF DESCRIPTION OF THE DRAWINGS

FIG. 1 depicts a program table which may be used in accordance with preferred embodiment of the present invention.

DETAILED DESCRIPTION OF THE PREFERRED EMBODIMENTS

Figure 2:
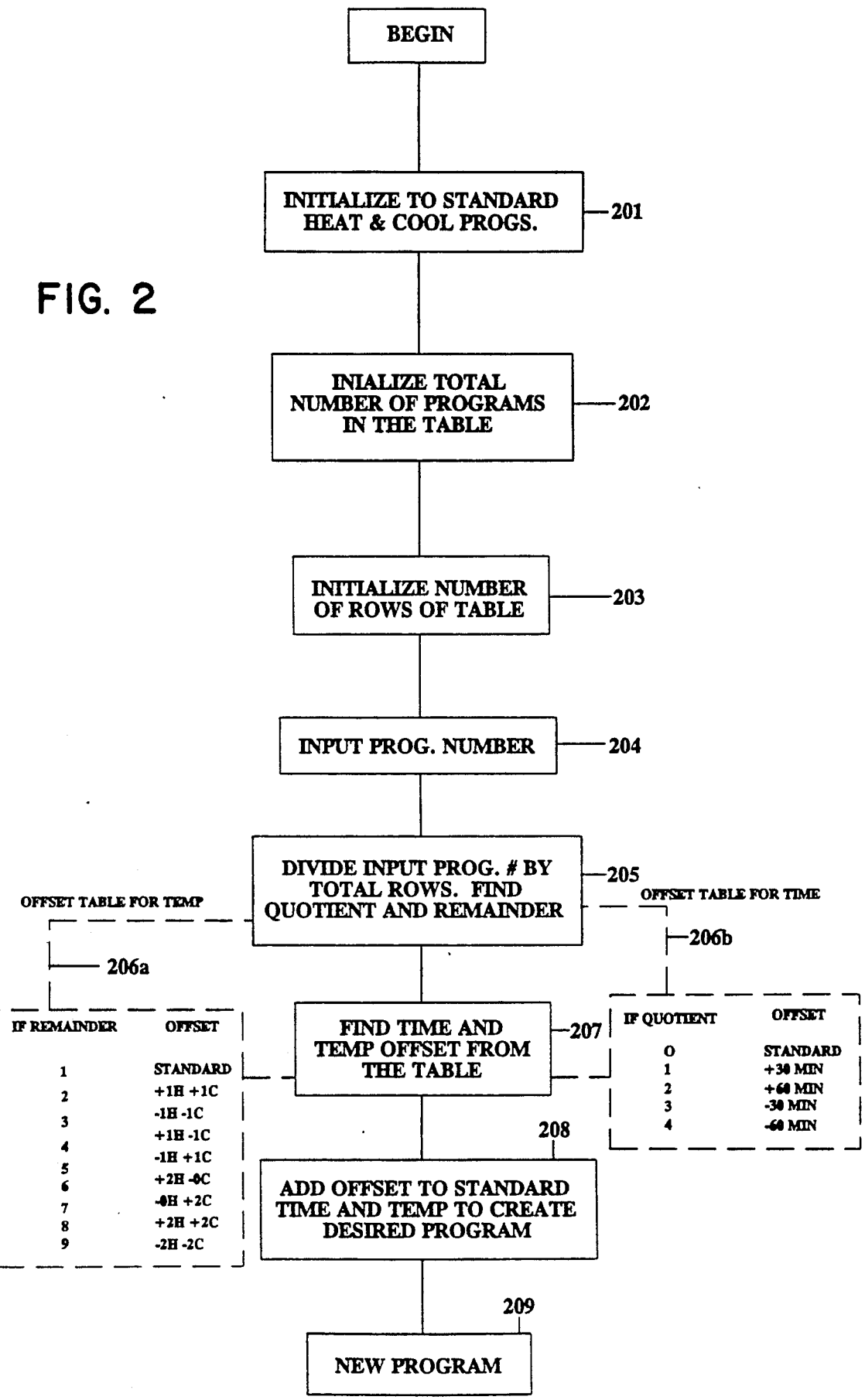
FIG. 2 depicts a flow chart illustrating the operation of various aspects of one preferred embodiment of the present invention.

FIG. 1 depicts a program table which illustrates certain aspects of the present invention. The invention, however, is not limited to the details of FIG. 1. FIG. 1 essentially shows a 5×9 matrix with the points of intersection labeled with the numbers 1-45. Other designators may be used. The heading for each of the columns includes a plurality of times. For example, the headings for column 1 are 6:00 AM, 8:00 AM, 4:30 PM, and 11:00 PM. The headings for column 2 are 6:30 AM, 8:30 AM, 5:00 PM and 11:30 PM. In a preferred embodiment, there may be a fixed relationship between the times and/or temperatures of a standard program (e.g., the times and temperatures of column 1 and row 1) and the respective times and temperatures in some or all of the other columns and rows. This fixed relationship is shown by the offsets associated with the respective rows and columns. For example, the times of column 2 are all 30 minutes later than the times of column 1. Therefore, the offset is +0.30 (30 minutes). In other embodiments, this may not necessarily be so. As noted in FIG. 1, two sets of four temperatures are shown for each heading for each row. For example, in row 1, the first set of temperatures are 68, 63, 68, and 60 (°F.). These correspond to heating system settings. The second set of temperatures for row 1 are 78, 83, 78, and 77 (°F.). These correspond to cooling system settings. Similarly, two sets of a plurality of temperatures are provided for each of the other rows in the matrix of FIG. 1.

In operation, if a user desires to select the times of column 1 (6:00 AM, 8:00 AM, 4:30 PM and 11:00 PM) and to have the temperatures at those times correspond to the temperatures shown in the row headings of row 8 of FIG. 1 (70, 65, 70, 62 for heating; 80, 85, 80, 79 for cooling) the user would merely enter the programming mode (in a known manner) and select program set 8. Selection of program set number 8 will cause the times of column 1 and the respective temperatures of row 8 to be stored in a memory to thereby program the thermostat. Therefore, for this example, the memory will be programmed as shown in Table 3.

TABLE 3

| Prog. | Time | Temperature (heating/cooling) |
|---|---|---|
| 1 | 6:00 AM | 70 F./80 F. |
| 2 | 8:00 AM | 65 F./85 F. |
| 3 | 4:30 PM | 70 F./80 F. |
| 4 | 11:00 PM | 62 F./79 F. |

Therefore, in order to program four set times and corresponding heating and cooling temperatures for each set time, a user simply selects a single program set number and this information is stored in a thermostat memory. This avoids the time and difficulty which is required for a user to individually select a plurality of times and individually select a corresponding number of temperatures to be associated therewith.

In an alternative embodiment, instead of storing a whole matrix (i.e., all of the program sets), which may occupy a large amount of memory space, one or more standard programs can be pre-programmed and used to generate several other program sets. Preferably, each program set has times and temperatures which may vary by a constant factor (or have some other predetermined relationship) with respect to the times and/or temperatures of the standard program set. For example, the thermostat may store just one program set, for example, program set 1, with temperatures $T_1, T_2, T_3$ and $T_4$ and corresponding times $t_1, t_2, t_3$ and $t_4$. Program 2 may be derived from the stored parameters of program set 1 by adding a constant factor to the times and/or temperatures of program set 1. For example, the times of set 2 may all be 30 minutes later than the times of program set 1. In this case, based on the times and temperatures of program set 1 given above, program set 2 will have times of $t_1+30$, $t_2+30$, $t_3+30$ and $t_4+30$. Similarly the temperatures can also be altered by a constant amount, for example +2° F. In this case, based on the example given above, each temperature of program set 2 will vary by +2° F. from the temperatures of set 1. Therefore, the temperatures of program set 2 will be $T_1+2$, $T_2+2$, $T_3+2$ and $T_4+2$. In this manner, a virtual matrix can be generated using one stored program set and one or more formulas or constants. In this way, there will be no need to store the times and temperatures of program set 2 since they can be derived from the single set of times and temperatures stored in connection with standard program set 1. Of course, a variety of other constants or formulas may be used to enable various program sets to be derived from the one or more standard program sets.

Of course, it may be desired to separately program heating parameters and cooling parameters. In this case, there may be two matrices stored, one for heating and one for cooling. In this case, two program sets may be selected and stored in the manner described above. Alternatively, one or the other of the sets of temperatures associated with a particular row may be separately accessed in a heating program mode or a cooling program mode, for example. In operation, depending on whether the user selects heating or cooling (e.g., by means of a switch on the thermostat), either the heating parameters (times and temperatures) or cooling parameters will be used by the thermostat to control either a heating or cooling system. Alternatively, the thermostat can be designed to automatically change from cooling to heating or heating to cooling depending upon the set time and temperatures. According to this embodiment, there is no need for the user to select the heating or cooling mode.

Preferably, the program set is selected by a "Prog Select" key or other suitable means, which generally enables the user to select the number of the desired program set. In this way, there is no need to separately use time or temperature keys to program a plurality of times and temperatures. All that is required is a single selection from a plurality of "pre-programmed" program sets. This greatly simplifies the user programming of a plurality of times and temperatures in a programmable thermostat.

A variety of different mechanisms are available to enable the user to view the particular set times and temperatures associated with each program set number. For example, a display may be associated with the thermostat or separate charts may be provided in a manual and/or in a table on the door of the thermostat, for example. Preferably, the user does not have access to alter the standard program sets.

Figure 3:
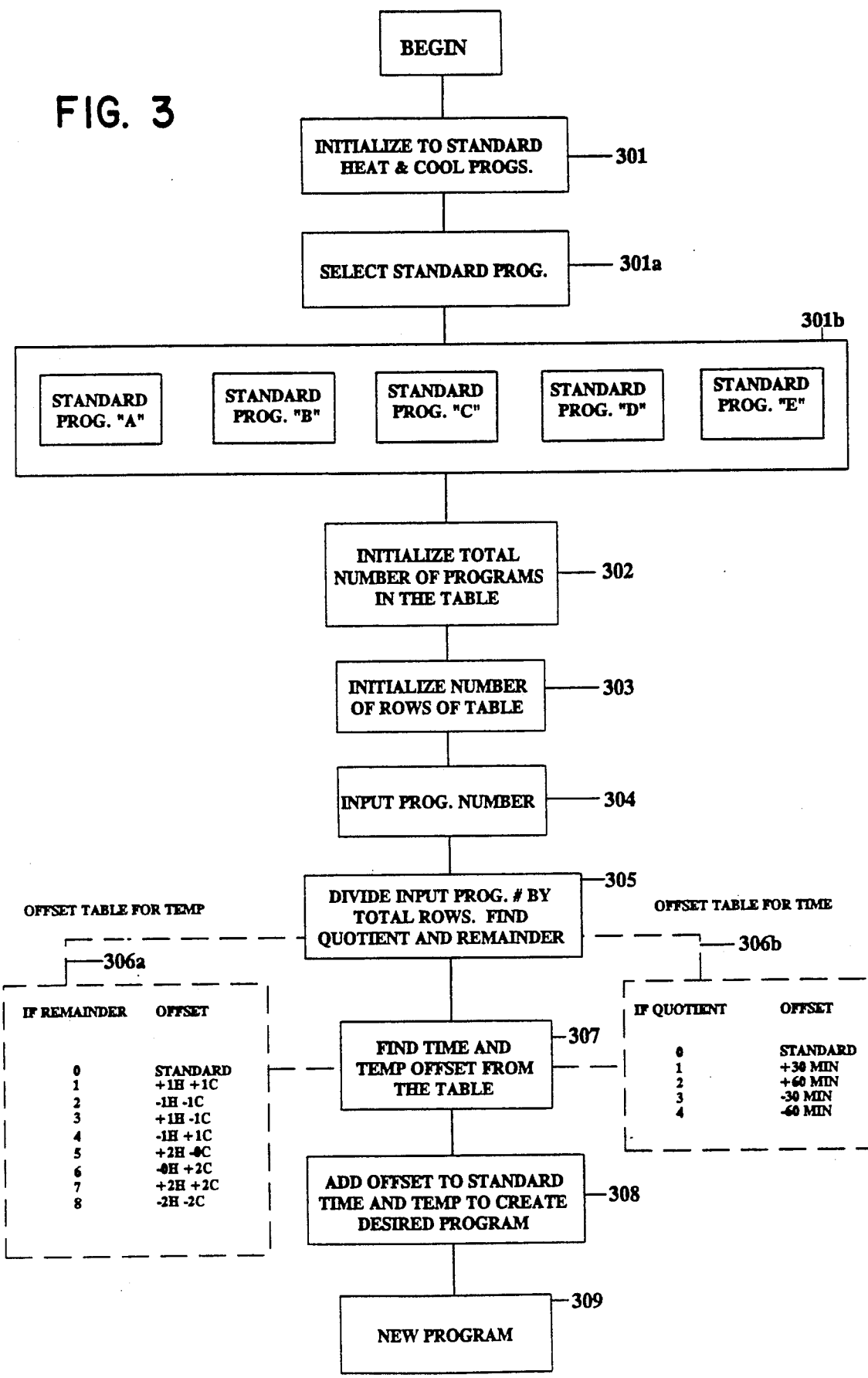
FIG. 3 is a flow chart illustrating the operation of various aspects of one preferred embodiment of the present invention.

FIG. 2 shows a general flow chart of a procedure which may be used to program the thermostat according to one embodiment of the invention. First, the standard heating and cooling program(s) are initialized (step 201). For example, this may involve loading a default program or standard initialization program into the memory of the thermostat. For example, program 1 from FIG. 1 may be loaded. Therefore, the times 6:00 AM, 8:00 AM, 4:30 PM and 11:00 PM will be loaded as the program times and the heating and cooling temperatures associated with these times will be 68/78, 63/83, 68/78, and 60/77, respectively. Next, the total number of programs in the table is initialized (step 202). In the example shown in FIG. 1, there are 45 total program numbers (5×9). Next, the number of rows of the table is initialized (step 203). In this case, there are nine rows (and five columns). Then, the controller waits for the input of a program number (step 204). For example, let us assume that the number 22 is entered. Then, the input program number (22) is divided by the total number of rows to find a quotient and remainder (step 205). In this case, 22/9 equals a quotient of 2 and a remainder of 4. In one embodiment this information could be used to indicate a selection of the second column and the fourth row, or vice versa. If a complete table is stored (such as shown in FIG. 1) the corresponding times and temperatures of the selected program can be retrieved and stored in the thermostat memory. In another embodiment, this information is provided to an offset table for temperature (step 206a) and an offset table for time (step 206b). And the time and temperature offsets are found from the offset tables (step 207) to establish a desired offset for the times and temperatures of the standard program. In the example shown, the offset corresponding to a quotient of 2 is +60 min. The remainder is used to establish the offset for the temperature. In the example shown, a remainder of 4 corresponds to an offset of +1 for heating (H) and −1 for cooling (C). In step 208, the offsets are added to the standard time and temperature to create the desired program. In the example shown, the selected times would be 6:00 AM+1:00=7:00 AM; 8:00 AM+1:00=9:00 AM; 4:30 PM+1:00=5:30 PM; and 11: PM+1:00=12:00 PM. The heating temperatures would be 68/63/68/60+1=69/64/69/61. The cooling temperatures would be 78/83/78/77−1=77/82/77/76. These values are then stored in the thermostat memory as the programmed times and temperatures. As shown in FIG. 3, various standard programs may be provided. The operation of FIG. 3 is similar to that of FIG. 2. The primary difference is that during initialization, the user may select from a plurality of standard programs (e.g. A, B, C, D, or E).

Figure 4:
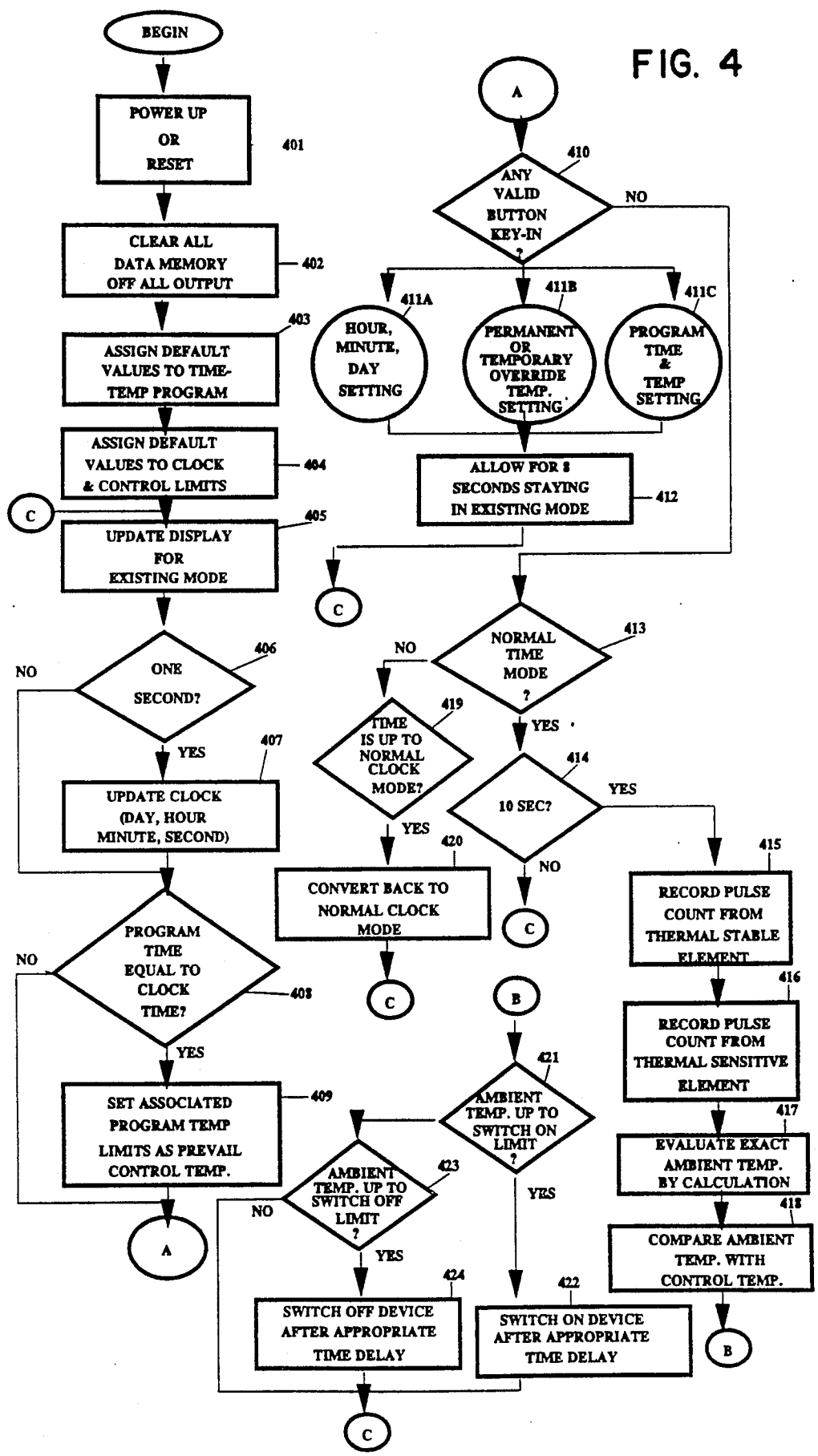
FIG. 4 is a flow chart which illustrates the operation of various aspects of the present invention.

A more detailed flow chart of the operation is shown in FIG. 4. As shown in FIG. 4, after power up or reset (step 401), all data in memory is cleared (step 402). Next, default values are assigned to the time-temperature program (step 403). For example, program 1 from Table 1 may be used to provide the default values. Next, default values are assigned to the clock and control limits (step 404). For example, the default time may be 12:00 AM Monday and maximum and minimum limits may be assigned. Next, the display is updated for the existing mode whether it is time, temperature, programming or other mode (step 405). The existing mode is a mode where the display shows a current situation (normal time mode) and the control by the thermostat is as per the existing control conditions of the program or manual override, or any other control conditions existing just after the user makes the use of the keys to insert a new program number, set time, manual override or any other such operation which the user performs. Next, it is determined if one second has passed (step 406). If yes, the clock is updated as necessary (step 407). If in step 406, one second has not passed, a determination is made as to whether the program time equals the clock time (step 408). If yes, the control passes to step 409. If not, control passes to step 410. In '409, the program temperature is replaced by new program temperature of a next program. At step 410, it is determined whether any valid key has been pressed. If yes, control passes to steps 411a, 411b, and 411c. If not, control passes to step 413. Any time the user presses any of the available keys on the thermostat for a particular reason (in this thermostat there are three main reasons to press keys) 411A, 411B, or 411C, the thermostat allows the user to perform the operation such that instead of displaying the current time and temperature (which are normally displayed continuously) on the display, the display will interact with the key strokes and display the operational sequence depending on the key strokes. In other words, when the user is pressing keys, the display is in command of the keystrokes. The current time and temperature are not displayed. If control is in 411A, B or C and the user does not press any of the keys for a period of 8 seconds, it will be assumed that the user has completed the operation in 411A, B, C and the program automatically exits 410. But before continuing to 413 the current time and room temperature is updated since some time period was used by the user in 411A, B, or C to perform an operation. As a result, there was no updating of the time and temperature on the display. To update to the existing (new) situation(s) after the key operations, the control passes to "C" to bring back the display and control in command of current program. From step 411 A–C, control passes to step 412 and then back to "C", i.e., step 405. In step 412, a lapse time of eight seconds is provided between two key strokes to enter data or any other operation. In step 413, it is determined whether the control is in a normal time mode. If yes, it is determined whether ten seconds has passed (step 413). If the results of the determination of step 413 is negative, control passes to step 419.

The ten seconds (or other desired time) is really a no-activity period of some functions of the computer, such as measuring and displaying room temperature. This period saves battery usage by not making the computer work hard all the time continuously. During this ten second period, the display is in a normal time mode. But if during this ten second period the user interrupts, for example by pressing any of the keys, to perform certain functions, the control jumps to "C" without waiting for those 10 seconds to be completed so that the user does not have to wait up to ten seconds to see a response to the selected operation. In step 419 it is determined whether it is time to return to normal clock or time mode. If yes, the control causes the conversion back to the normal clock mode (step 420). If not, control passes back to "C" at step 405. In step 414, if ten seconds of no activity has passed, a temperature measurement is made and a pulse count from a thermal stable element is recorded (step 415). Temperature measurement is the most battery power consuming activity performed by the thermostat. Instead of updating the temperature every second (as time is done), if it is done at certain time intervals, e.g., ten seconds, considerable battery power can be saved. Next, the pulse count from a thermal sensitive element is recorded (step 416). Then, the ambient temperature is calculated (step 417), and the calculated ambient temperature is compared with the control temperature programmed for the particular time (step 418) and control passes to step 421. In step 421 it is determined whether the ambient temperature has reached the switch on limit. If yes, the appropriate device is switched on after an appropriate time delay (step 422). This time delay may preferably be three–six minutes which is provided for the safety of the compressor. The time delay is the period of time from when the last time the system went off. If the system is switched on immediately within three–six minutes, after the last switch off instant, it can damage the system. To prevent the compressor from damage, a built-in timer is provided to prevent the restarting unless three–six minutes have passed from the last off time of the compressor. For heating systems, this time delay is not required. If the result of the determination of step 421 is negative, it is determined whether the ambient temperature has reached the switch off limit (step 423). If yes, the appropriate device is switched off after an appropriate time delay (step 424). If the results of the determination of step 423 is negative, or after the appropriate device is switched on or off (step 422, 424), control passes back to step 405.

The thermostat may comprise a single chip micro-controller, for example an OKI MSM64164. Other micro-controllers specially designed for temperature measurement applications may also be used. The micro-controller preferably has built in oscillation circuitry and counters for measuring the frequency generated by an externally attached thermal sensitive element. Preferably it has 2048 word Read-Only-Memory for software, and 128×4 bits Random-Access-Memory for data storage. An input panel is provided for a user to key in all the program information. A set of output device select switches are also provided for the user to select one or more output devices being controlled. Output driving circuitry which switches on or off the relevant device under control is also provided.

The system clock oscillator (preferably 32,768 Hz.) generates the main timing signal for the micro-controller. This timing signal is repeatedly divided by divider 3 (FIG. 5) to generate a one second timing signal for the software counter.

Figure 5:
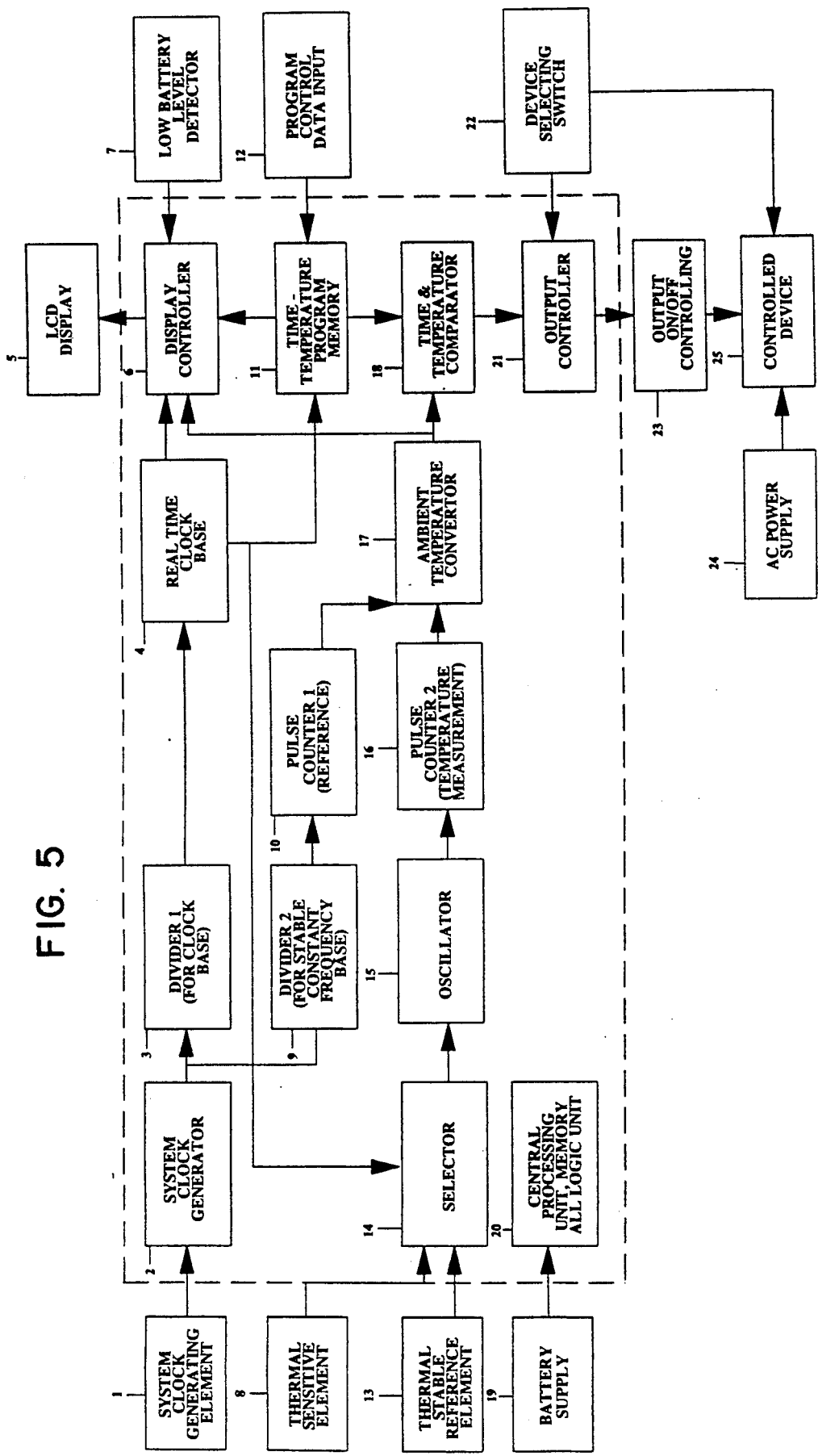
FIG. 5 is a block diagram illustrating a central circuit which maybe used with the present invention.

A preferred embodiment of the control apparatus is shown in FIG. 5. With reference to FIG. 5, the thermal stable element 13, which may comprise a fixed resistor (which serves as a reference) is selected by the selector 14 and connected to the oscillator 15. Thermal stable element 13 causes oscillator 15 to produce a constant oscillation frequency. The number of pulses generated by the oscillator 15 within a fixed period is counted by pulse counter 16 and recorded. Next, the thermal sensitive element 8, which may comprise a thermistor, is selected and connected to the oscillator 15. This causes the oscillation frequency generated by the oscillator to vary as a function of the temperature sensed by the thermal sensitive element. The number of pulses received by the pulse counter 16 within the same period is also recorded. Pulse counter 10 fixes the exact period of time for pulse counter 16. The number of pulses generated by the thermal stable element 13 and thermal sensitive element 8 are compared and the exact ambient temperature is calculated from the result of the comparison by the ambient temperature converter 17.

Preferably, the thermostat composes a set of built-in programs. By using the table of the program listing as described above, the user may enter the preferred program set via the input panel 12.

Each second the micro-controller tries to compare the program time with the real time clock and see whether there is a program time match. Once matched, the two program temperature limits (one for heating control, and the other for cooling control) are used as control reference points until the next program time match occurs. The time and temperature converter 18 compares the ambient temperature with these two control reference points. Once the ON/OFF criteria is reached, an ON/OFF switching signal is sent out to the output controller 21 for switching device 25 ON or OFF. The controlled device may be selected by a user by device selecting switch 22. This switch may switch, for example, between cooling and heating devices, or both.

Additionally, it is preferable to enable the user to manually override the current set temperature temporarily by inserting a manual override temperature which is effective until the next time change of the selected program set. Alternatively, overrides for an extended period of time (e.g., when the user goes on vacation) may be provided. In this case, the user can return to the set program when desired.

Additionally, separate matrices can exist for weekdays and weekends (or holidays) to enable different programs to be operable for weekdays and weekends (or holidays) or other desired periods of times.

Another feature is that the thermostat may have the capability to monitor the total usage of the system by logging the run time of the system and storing this information in a memory. The usage can be selectively recalled by the user.

The foregoing are the preferred embodiments of the invention. All times, temperatures, constants and formulas shown above are by way of example only. The number of times, temperatures, stored programs and standard programs are also for purposes of example. Various modifications will be readily apparent to one of ordinary skill in the art. For example, the standard programs can include various combinations of temperatures keeping the times constant. Alternatively, the temperatures can be constant and various combinations of times can be used for different standard programs. Other modifications will be readily apparent to one of ordinary skill in the art. The invention is only limited by the claims appended hereto.

We claim:

1. A method of programming a programmable thermostat with one of a plurality of built-in program sets, where each built-in program set comprises a plurality of times and at least a plurality of temperatures, said method comprising the steps of: selecting a desired one of said plurality of built-in program sets and programming said programmable thermostat with the times and temperatures associated with the desired built-in program set.

2. The method of claim 1 wherein said step of storing said plurality of built-in program sets comprises a step of storing a plurality of standard program sets, said method further comprising the step of deriving said desired program set from one of said standard program sets.

3. The method of claim 2 further comprising the step of a user selecting one of said plurality of standard program sets.

4. A programmable thermostat comprising:
a first memory which may be programmed with at least a desired one of a plurality of built-in program sets;
user selection means for enabling a user to select an alphanumeric identifier corresponding to at least one desired built-in program set;
means responsive to said user selection means for causing the desired built-in program set to be stored in said first memory.

5. A programmable thermostat comprising:
a first memory which may be programmed with at least a desired one of a plurality of built-in program sets, wherein each program built-in set comprises a plurality of times and at least one set of a corresponding number of temperatures;
user selection means for enabling a user to select said at least one desired built-in program set; and
means responsive to said user selection means for causing the times and temperatures of said desired program built-in set to be stored in said first memory.

6. The programmable thermostat of claim 5 wherein said desired built-in program set comprises a plurality of times and a corresponding plurality of temperatures and said thermostat further comprises a second memory means for storing at least one standard program set having a plurality of times and at least a corresponding plurality of temperatures and wherein the plurality of times of said desired program set has a predetermined relationship with respect to the plurality of times of said standard program set.

7. The programmable thermostat of claim 5 further comprising a second memory for storing a plurality of built-in program sets and wherein said user selection means is used to select one of said plurality of built-in program sets stored in said second memory.

8. The programmable thermostat of claim 5 wherein each built-in program set comprises a plurality of times and a first corresponding plurality of temperatures and a second corresponding plurality of temperatures.

9. The programmable thermostat of claim 8 wherein said first plurality of temperatures correspond to temperatures for controlling a heating system.

10. The programmable thermostat of claim 8 wherein said second plurality of temperatures correspond to temperatures for controlling a cooling system.

11. The programmable thermostat of claim 4 wherein said first plurality of temperatures is used for controlling a heating system and said second plurality of temperatures is used for controlling a cooling system.

12. A programmable thermostat comprising:
a first memory which is programmable;
a second memory for storing a plurality of built-in program sets, where each built-in program set comprises a plurality of times and at least a corresponding number of associated temperatures;
user selection means for enabling a user to select a desired one of said stored built-in program sets; and
means responsive said user selection means for causing the times and associated temperatures of said selected built-in program set to be stored in said second memory.

13. A programmable thermostat comprising:
a first memory which is programmable;
a second memory for storing at least one standard program set, wherein said standard program set comprises a plurality of times and at least a corresponding number of associated temperatures;
user selection means for enabling a user to select a desired program set to be stored in said second memory, wherein at least one of said times and temperatures of said desired program set have a predetermined relationship with respect to the times and temperatures of said standard built-in program so that said desired program may be derived from said standard built-in program; and
means responsive said user selection means for causing the times and associated temperatures of said desired program set to be stored in said first memory.

14. The programmable thermostat of claim 13 wherein said second memory comprises a plurality of standard program sets, and wherein said user selection means further comprises means for selecting one of said plurality of standard program sets and wherein said desired program set is derived from said selected standard program set.

15. The programmable thermostat of claim 13 wherein each program set comprises a plurality of times and a first corresponding plurality of temperatures and a second corresponding plurality of temperatures.

16. The programmable thermostat of claim 15 wherein said first plurality of temperatures is used for controlling a heating system.

17. The programmable thermostat of claim 15 wherein said second plurality of temperatures is used for controlling a cooling system.

18. The programmable thermostat of claim 15 wherein said first plurality of temperatures is used for controlling a heating system and said second plurality of temperatures is used for controlling a cooling system.

* * * * *